(12) United States Patent
Veit et al.

(10) Patent No.: US 10,486,093 B2
(45) Date of Patent: Nov. 26, 2019

(54) COALESCING ELEMENT OF A WATER SEPARATOR DEVICE, AND WATER SEPARATOR DEVICE

(71) Applicant: MANN+HUMMEL GMBH, Ludwigsburg (DE)

(72) Inventors: Martin Veit, Gaertringen (DE); Gernot Boiger, Winterthur (CH); Gerd Behling, Backnang (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/342,950

(22) Filed: Nov. 3, 2016

(65) Prior Publication Data

US 2017/0050134 A1    Feb. 23, 2017

Related U.S. Application Data

(63) Continuation of application No. PCT/EP2015/059681, filed on May 4, 2015.

(30) Foreign Application Priority Data

May 5, 2014    (DE) .................. 10 2014 007 138

(51) Int. Cl.
*B01D 29/15* (2006.01)
*F02M 37/22* (2019.01)
*B01D 36/00* (2006.01)
*B01D 35/00* (2006.01)
*F02M 37/24* (2019.01)

(52) U.S. Cl.
CPC .......... *B01D 36/003* (2013.01); *B01D 29/15* (2013.01); *B01D 35/005* (2013.01); *F02M 37/24* (2019.01)

(58) Field of Classification Search
CPC .... B01D 36/003; B01D 29/15; B01D 35/005; F02M 37/221
USPC ..................................................... 210/DIG. 5
See application file for complete search history.

(56) References Cited

U.S. PATENT DOCUMENTS

| 3,228,527 A | 1/1966 | McPherson |
| 3,567,619 A | 3/1971 | Brown |
| 4,502,956 A | 3/1985 | Wilson |

(Continued)

FOREIGN PATENT DOCUMENTS

KR    1020080071654 A    5/2008

OTHER PUBLICATIONS

Dr. Wilhelm Foerst, Ullmann's Encyclopedia of Technical Chemistry, 18th Volume, published 1967 in Germany, Viscose sponges and viscose sponge cloth.

*Primary Examiner* — Madeline Gonzalez
(74) *Attorney, Agent, or Firm* — James Hasselbeck (57) ABSTRACT

A coalescing element for a water separator device for fuel is provided with at least one coalescing medium that separates water contained in the fuel from the fuel. The coalescing element is arranged in a housing of the water separator device such that the coalescing element separates at least one fuel inlet of the housing from at least one fuel outlet of the housing. The at least one coalescing medium is arranged in a flow path of the fuel from the at least one fuel inlet to the at least one fuel outlet. The at least one coalescing medium contains at least one sponge-like coalescing material suitable for coalescing water. The coalescing element is used in fuel filters such as diesel fuel filters of an internal combustion engine.

13 Claims, 9 Drawing Sheets

(56) References Cited

U.S. PATENT DOCUMENTS

2011/0084028 A1\* 4/2011 Stanfel ................ B01D 17/045
                                                                     210/708
2014/0284263 A1 9/2014 Duerr et al.

\* cited by examiner

Prior Art

COALESCING ELEMENT OF A WATER SEPARATOR DEVICE, AND WATER SEPARATOR DEVICE

CROSS-REFERENCE TO RELATED APPLICATIONS

This application is a continuation application of international application No. PCT/EP2015/059681 having an international filing date of 4 May 2015 and designating the United States, the international application claiming a priority date of 5 May 2014, based on prior filed German patent application No. 10 2014 007 138.3, the entire contents of the aforesaid international application and the aforesaid German patent application being incorporated herein by reference.

BACKGROUND OF THE INVENTION

The invention concerns a coalescing element of a water separator device, in particular of a fuel filter, for fuel, in particular diesel fuel, in particular comprising at least one additive, in particular of an internal combustion engine, in particular of a motor vehicle, that can be arranged in a housing of the water separator device such that it separates at least one fuel inlet of the housing from at least one fuel outlet, wherein in the flow path of the fuel at least one coalescing medium for separating water contained in the fuel is arranged.

Moreover, the invention concerns a water separator device, in particular a fuel filter, for fuel, in particular diesel fuel, in particular comprising at least one additive, in particular of an internal combustion engine, in particular of a motor vehicle, comprising a housing comprising at least one fuel inlet for fuel to be treated, in particular purified, at least one fuel outlet for treated fuel, and at least one water outlet for water that has been separated from the fuel, wherein in the flow path of the fuel at least one coalescing medium for separating water contained in the fuel is arranged.

DE 10 2011 120 641 A1 discloses a fuel filter for fuel, in particular diesel fuel, of an internal combustion engine, in particular of a motor vehicle, and a filter element. A housing of the fuel filter comprises at least one fuel inlet for fuel to be purified, at least one fuel outlet for purified fuel, and at least one water outlet for water that has been separated from the fuel. In the housing, the filter element is arranged that separates the fuel inlet seal-tightly from the fuel outlet. The filter element comprises a filter medium that is designed as a hollow body and that, for filtration of the fuel, can be flowed through from the interior to the exterior or from the exterior to the interior. A coalescing medium designed as a hollow body is arranged in the flow path of the fuel downstream of the filter medium, surrounding it or in the interior delimited by it, for separating water contained in the fuel. The coalescing medium comprises at least one layer of nonwoven suitable for coalescing water. A main orientation of fibers of the at least one nonwoven layer extends transversely to a main flow path for the separated water downstream of the coalescing medium.

The invention has the object to design the coalescing element of a water separator device and a water separator device of the aforementioned kind with which the separation of water contained in the fuel is further improved.

SUMMARY OF THE INVENTION

This object is solved according to the invention in that the at least one coalescing medium comprises at least one sponge-like coalescing material suitable for coalescing water.

According to the invention, for coalescing the water at least one suitable sponge-like coalescing material is employed. The at least one sponge-like coalescing material comprises larger contiguous areas. The areas can be connected with each other, in particular fused. In and/or between the contiguous areas, holes or pores for catching water droplets and for passage of the water are provided.

On the at least one coalescing medium, even smallest water droplets which are contained in the fuel are united and united to larger water droplets in a different stage of the coalescing element and/or of the water separator device. In this context, the fine water droplets are retained at the at least one coalescing material and enlarged until they are again entrained by the fuel flow and carried away from the at least one coalescing medium. The water droplets can adsorb in surface-near pores of the sponge-like coalescing material. In this context, the water droplets penetrate into the pores and are retained therein. Following water droplets can coalesce to larger water drops with the water droplets retained in the pores.

In contrast to sponge-like coalescing material, in nonwoven material, which can be used as coalescing material in fuel filters that are known in the prior art, the water droplets can coalesce substantially only at intersections of fibers of the fleece. Moreover, in nonwoven material the water can be stored within the fibers. The fibers can swell and the passage openings between the fibers can be correspondingly reduced. The flow of water through the nonwoven material can thus be impaired. Corresponding pressure differentials between the inlet side and the outlet side can thus be increased undesirably.

The sponge-like coalescing material can have extremely good absorption properties. It can therefore have a correspondingly high absorption capacity for water. Sponge-like coalescing material can absorb approximately 14 times to approximately 20 times its dry weight in water. The sponge-like coalescing material can swell so that the absorption capacity for water can be further increased.

Moreover, the sponge-like coalescing material can exhibit a greater abrasion resistance than nonwoven material and the service life of the coalescing element can thus be increased. Moreover, the sponge-like coalescing material can exhibit a greater resistance in regard to squeezing or pressing than conventional nonwoven material.

The sponge-like coalescing material can also have the advantage that it can maintain its coalescing function for different fuels or fuel compositions. For example, when purifying fuels, in particular diesel fuel, which may contain at least one additive, the realization of the function of coalescing/water separation at the at least one sponge-like coalescing medium can be ensured.

Additives are auxiliary substances which change, in particular improve, the properties of the fuel. Additives are generally added in relatively small quantities to the fuel.

Downstream of the at least one sponge-like coalescing medium, the water drops can be precipitated, in particular in a precipitation gap, in a further stage of the coalescing element and/or of the water separator device. They can sink due to their specific weight in downward direction. This can be referred to as gravimetric water separation.

With the water separator device according to the invention, in particular the coalescing element according to the invention, even those fuels can be separated from water and, where necessary, purified whose specific weight is greater than that of water and in which, in analogy, the water drops will rise spatially in upward direction.

For this purpose, the coalescing element and/or the water separator device can be arranged upside down. Correspondingly, the at least one fuel inlet, the at least one fuel outlet, and, where necessary, at least one water outlet can be arranged correspondingly.

Advantageously, the water can be collected in particular in at least one water collecting space. The at least one water collecting space can advantageously be connected with at least one water outlet. By means of the at least one water outlet, the water can be drained from the at least one water collecting space.

The coalescing medium can advantageously comprise one or several layers comprised of or comprising sponge-like coalescing material. Each one of the layers within itself and/or the layers among each other may contain the same or different coalescing material. In addition to the sponge-like coalescing material, the at least one coalescing medium can also comprise another different kind of coalescing material.

The coalescing medium can advantageously be formed to a bellows. The coalescing medium can advantageously be folded, bent, pleated, and/or wound.

The coalescing material can advantageously be sponge cloth material or comprise it. The sponge cloth material can be in particular a layered structure. The sponge cloth material can advantageously have a thickness in the dry state of approximately 0.4 cm to 2 cm. The sponge cloth material can be produced according to a viscose method, in particular a cellulose xanthate method.

The invention is not limited to a water separator device of an internal combustion engine of a motor vehicle. Instead, it can be used also in other types of internal combustion engines, for example, in industrial motors.

Instead of being used for diesel fuel, the water separator device can also be used for water separation/purification of other types of liquid fuel.

In an advantageous embodiment, the coalescing element can comprise at least one filter medium. In this case, the coalescing element can also be referred to as filter element.

With the at least one filter medium, in particular particles which contaminate the fuel can be filtered out in a stage of the coalescing element.

Advantageously, the at least one filter medium can be designed as a hollow body.

Advantageously, the filter medium can be flowed through from the interior to the exterior or from the exterior to the interior for filtration of the fuel.

The coalescing element, in particular the filter element, can be of a multi-stage configuration. The fuel can flow through the at least one filter medium and the at least one coalescing medium for purification and water separation.

The at least one coalescing medium can advantageously be arranged at the outflow side of the at least one filter medium. In this way, the at least one coalescing medium can be protected by means of the at least one filter medium from becoming soiled. Alternatively or additionally, at least one coalescing medium can be arranged at the inflow side of the at least one filter medium.

Advantageously, the at least one coalescing medium can be arranged in an interior of the at least one filter medium. It can be surrounded by the at least one filter medium. Upon flow through the filter medium from the exterior to the interior, the at least one coalescing medium can thus be arranged at the outflow side of the at least one filter medium. In reverse flow through the filter medium, the at least one coalescing medium can be arranged at the inflow side. Alternatively or additionally, the at least one coalescing medium can surround the at least one filter medium. Accordingly, the at least one coalescing medium can be arranged at the inflow side or at the outflow side of the at least one filter medium.

Advantageously, the at least one coalescing medium can at least partially cover the at least one filter medium at the outflow side and/or inflow side.

The at least one coalescing medium can advantageously completely cover the at least one filter medium at the inflow side and/or at the outflow side. In this way, the fuel must pass mandatorily through the at least one coalescing medium. Alternatively or additionally, the at least one coalescing medium can cover only partially the at least one filter medium at the inflow side and/or at the outflow side. In this way, the fuel can flow through corresponding gaps of the at least one coalescing medium and can thus bypass the coalescing medium.

The at least one filter medium can comprise at least one particle filter layer. It can comprise advantageously filter paper, filter nonwoven or another different, in particular sponge-like, filter material which is suitable to filter out particles from the fuel, in particular diesel fuel.

Advantageously, the at least one filter medium can be comprised of one or several layers. The at least one filter medium can advantageously be folded, bent, pleated and/or wound. The filter medium, in particular the filter medium hollow body, can advantageously be bellows-like. The filter medium can advantageously be folded in a star shape. Advantageously, the filter medium can be folded in a zigzag shape and can be closed circumferentially. The filter medium hollow body can advantageously comprise at least one opening. Through the opening, the fuel that is to be purified can flow into the interior of the filter medium hollow body or purified fuel can flow out of the interior. At least one end face of the filter medium hollow body can advantageously be connected with an end member, in particular an end disk, preferably seal-tightly. With the at least one end member, the filter medium can be stabilized. At least one of the end members can comprise an opening. The opening can be connected, where necessary, with the opening of the filter medium hollow body.

The at least one filter medium can have advantageously the shape of a hollow cylinder, in particular of a circular cylinder. Alternatively, the filter medium can also be realized in another different shape, in particular as a type of hollow cone. The filter medium hollow body, instead of having a round base surface, can also have another different, in particular oval or angular, base surface.

In another advantageous embodiment, the at least one coalescing material can be produced synthetically. In this way, the coalescing material can be optimized in particular for the purpose of combining smallest water droplets in the process of water separation in fuels, in particular fuels with additives. Moreover, in this way the resistance relative to fuel and/or the at least one additive can be increased.

In a further advantageous embodiment, the at least one coalescing material can at least comprise cellulose, in particular viscose or regenerated cellulose, or a mixture of cellulose, in particular viscose or regenerated cellulose, and cotton. With cellulose/viscose and mixtures of cellulose/viscose and cotton, a water separation in fuels can be improved. In particular, the water separation in fuels with at least one additive can be further improved.

The cellulose/viscose can advantageously form, at least partially, at least one bonding material of the at least one coalescing material. The cotton can advantageously at least partially form, where necessary, at least one carrier material of the at least one coalescing material. The cotton can serve as a "cross-linker".

Advantageously, the at least one coalescing material can be produced of a proportion of approximately 70% of wood as starting material. The wood can advantageously be processed in particular in reactors by means of solvents to viscose. Advantageously, fibers are not destroyed in the process.

In a further advantageous embodiment, the at least one coalescing material can comprise fibers, in particular cellulose fibers/viscose and/or cotton fibers. The coalescing material can comprise in this context a mixture of the corresponding fibers. The fibers can mechanically stabilize the at least one coalescing material. The fibers can, where necessary, form the at least one carrier material. They can serve as staple fibers.

Advantageously, the fibers, in particular the cotton fibers, can have a length within the magnitude of approximately 20 mm.

Advantageously, the starting material for the at least one coalescing material may comprise a proportion of 30% cotton.

Advantageously, cotton as a staple fiber can be individualized in particular by tearing for producing the coalescing material. Subsequently, the cotton can be moistened with sodium hydroxide solution.

In a further advantageous embodiment, the at least one coalescing material can be produced from a mass that contains a pore forming agent, in particular Glauber's salt, wherein the pore forming agent may be removed in the finished coalescing material.

Advantageously, for producing the at least one coalescing material, at least one bonding material, in particular viscose, and at least one carrier material, in particular cotton, in particular in the form of fibers, together with a pore forming agent, in particular salt crystals, preferably Glauber's salt, and, where necessary, coloring agents can be mixed and kneaded. During the kneading process, the material can become three-dimensionally interlinked. In this context, it may be enabled that no artificial fiber formation and no mechanical additional compaction is produced. The kneaded mass can have a relatively high viscosity.

The kneaded mass can be spread in particular by a machine onto a support web, in particular a grid. In this context, the mass can applied in particular by nozzles onto the support web. The mass can be pressed onto the support web.

The mass in particular can be dried on the support web. In doing so, the mass becomes solid. The incorporated pore forming agent serves for forming pores. The pore forming agent predetermines the pore size. In the solidification process, the cellulose, in particular viscose, can be regenerated. The cellulose/viscose and the cotton can join to form a unit.

The pore forming agent, in particular the crystals of the Glauber's salt, can be washed out in particular with water and/or acid. The finished sponge-like coalescing material comprises the corresponding pores. In this context, the at least one carrier material can predetermine a strength and/or interlinking. The at least one bonding material can form areal/contiguous areas.

In contrast to the sponge-like coalescing material, for the manufacture of known nonwoven material different individual kinds of fiber are deposited in a mixed state and compacted. This can be done by means of a water jet process or by needling. Viscose fibers are produced for this purpose separately, i.e., dissolved and spun by spinnerets, and added as fibers.

In a further advantageous embodiment, the at least one coalescing material may comprise at least one carrier material which can be interlaced with at least one bonding material. In this way, the at least one carrier material can enter into or form a composite with the at least one bonding material. In this way, larger contiguous areas with intermediately positioned holes can be realized. The areas can be connected with the at least one bonding material.

The at least one carrier material, in particular cotton, can serve as a "cross-linker". It can contribute to the strength of the at least one coalescing material, in particular can substantially effect it.

Advantageously, the at least one coalescing material can be realized as a layer structure. In this way, a thickness of the coalescing medium that can be flowed through by the fuel can be varied.

Advantageously, the at least one carrier material may comprise at least one synthetic proportion and/or at least one non-synthetic proportion.

Advantageously, the at least one carrier material can comprise at least one textile material, a woven material, a material that is not woven (nonwoven), a net, a mesh, a braided material, a knit material, a warp-knit material, stitch-bonded nonwoven material, a fleece, a felt and/or another material that comprises fibers or is free of fibers.

Advantageously, the at least one carrier material may comprise fibers, in particular cotton fibers and/or cellulose fibers and/or viscose fibers. The at least one carrier material can be connected with the at least one bonding material, surrounded by it or interlaced with it in another way, in particular non-fibrous or nontextile-like.

The at least one bonding material can advantageously be initially flowable for producing the at least one coalescing material. In this way, the at least one bonding material can interlace with the at least one carrier material. The bonding material can flow around and/or embed/envelope possible carrier structures of the carrier material.

Advantageously, the at least one bonding material for producing the at least one coalescing material is not processed textile-like, in particular not spun, woven, braided, sewn, knitted, warp-knitted, or the like.

Advantageously, the at least one bonding material may comprise at least viscose. The at least one bonding material can advantageously be free of fibers. In this way, the flowability can be improved. Moreover, the composite-forming properties relative to the carrier material can be improved. Alternatively, the at least one bonding material may contain fibers. In this way, it can contribute to the strength of the at least one coalescing material.

In a further advantageous embodiment, the at least one coalescing medium can be designed as a hollow body. The hollow body of the at least one coalescing medium can be simply arranged, where necessary, in the interior of the hollow body of the at least one filter medium. Alternatively, the at least one filter medium hollow body can be arranged in the hollow body of the at least one coalescing medium. The corresponding circumferential sides of the hollow bodies can be resting against each other in this context. The circumferential sides of the hollow bodies can support each other mutually. Alternatively, the circumferential sides of the hollow bodies can be spaced apart from each other.

Advantageously, the hollow body of the at least one coalescing medium and, where necessary, the hollow body of the at least one filter medium can have a similar shape.

Advantageously, they can have a size matched to each other. In this way, the hollow bodies can be arranged inside each other in a space-saving way.

The hollow body of the at least one coalescing medium can advantageously have a cylindrical or conical shape. The cross-section of the hollow body can advantageously be round, oval or angular. The hollow body can advantageously be closed circumferentially. The hollow body can advantageously be open at least at one of its end faces. Here, the separated water and/or the fuel can flow out of an interior of the hollow body or fuel laden with water can pass into the interior of the hollow body.

At least one support body, in particular a support tube, can be arranged in an interior of the coalescing element, in particular of a coalescing medium hollow body and/or, where necessary, of a filter medium hollow body, or so as to surround it. On the at least one support body, the at least one coalescing medium and/or, where necessary, at least one filter medium can be supported.

In a further advantageous embodiment, in the flow path of the fuel downstream of the at least one coalescing medium, surrounding it or in the interior delimited by it, at least one hydrophobic fuel-permeable separating medium designed as a hollow body can be arranged for separation of water contained in the fuel in such a way that at least one precipitation gap for separated water can be realized between the at least one coalescing medium and the at least one separating medium. On the at least one separating medium water drops which are contained in the fuel can be retained. In this way, the water separation can be improved. Advantageously, the water drops which had been combined by means of the coalescing medium can be separated better.

Advantageously, the at least one separating medium can delimit the at least one precipitation gap on the side opposite the at least one coalescing medium. The large water drops combined by the at least one coalescing medium can be precipitated in the flow path of the fuel downstream of the at least one coalescing medium in the at least one precipitation gap. They can sink or can rise, depending on the specific weight of the fuel.

Advantageously, the at least one separating medium is screen-like. The screen-like, in particular woven, separating medium has the advantage that the water drops are retained at the screen fibers and in particular can drip down or can rise up. In a screen-like separating medium the water can be retained optimally. The mesh openings of a screen-like fabric can be predetermined in a simple and defined way. It can be embodied to be optimally permeable for the fuel. With a screen-like structure, the pressure loss at the at least one separating medium can be minimized in a simple way.

The at least one separating medium can advantageously have a shape similar to the hollow body of the at least one filter medium and/or, where necessary, of the hollow body of the at least one coalescing medium. In this way, the hollow body and the separating medium can be arranged in a space-saving way inside each other.

The at least one separating medium can advantageously have a cylindrical or conical shape. The cross-section of the at least one separating medium can advantageously be round, oval or angular. The at least one separating medium can advantageously be closed circumferentially. The at least one separating medium can advantageously be open at least at one of its end faces. Here, the fuel from which water has been removed can flow out of an interior of the at least one separating medium or the fuel laden with water can be guided for water separation into the interior.

Advantageously, the at least one precipitation gap, where necessary, can be connected with the at least one water collecting space and/or the at least one water outlet of the housing of the fuel filter.

In a further advantageous embodiment, the at least one coalescing medium, the at least one filter medium, where necessary, and/or the at least one separating medium, where necessary, can be arranged coaxially. A coaxial arrangement saves space. Moreover, in a coaxial arrangement a flow course of the fuel in radial direction from the exterior to the interior or in radial direction from the interior to the exterior can be optimized in a simple way. The base surface of the at least one coalescing medium, of the at least one filter medium, where necessary, and/or of the at least one separating medium, where necessary, can be similar in this context. The base surfaces can however also be different. They can be in particular round, oval or angular.

The at least one coalescing medium, the at least one filter medium, where necessary, and/or the at least one separating medium, where necessary, can also be arranged in a different way than coaxial.

In a further advantageous embodiment, the coalescing element can be a round filter element. In this context, it can be advantageously a round filter element with a round cross-section, an oval round filter element with an oval cross-section, a conical round filter element which has a conical shape, or a conical oval round filter element. Round filter elements are characterized by a filter medium that is circumferentially closed relative to an element axis. On at least one end face the filter medium can be connected, preferably seal-tightly, with an end member, in particular an end disk. At least one of the end members can comprise a central passage for the fuel. The fuel can flow through the round filter element relative to the element axis in radial direction from the exterior to the interior or in opposite direction.

Round filter elements can be designed in a space-saving way. With round filter elements an optimal ratio of filtering/separating surface relative to the mounting space can be realized.

The object is solved according to the invention moreover by the water separator device in that the at least one coalescing medium comprises at least one sponge-like coalescing material suitable for coalescing water.

The advantages and features which have been listed in connection with the coalescing element according to the invention and its advantageous embodiments apply likewise to the water separator device according to the invention and its advantageous embodiments, and vice versa.

Advantageously, the at least one coalescing medium can be a component of a coalescing element, in particular of a coalescing element according to the invention.

In an advantageous embodiment, at least one filter medium can be arranged in the housing.

Advantageously, the at least one filter medium can be a component of a coalescing element, in particular of a coalescing element according to the invention. In this case, the coalescing element can also be referred to as a filter element. Accordingly, the water separator device can also be referred to as fuel filter.

Advantageously, the at least one filter medium can separate the at least one fuel inlet from the at least one fuel outlet. Advantageously, the at least one filter medium can be designed as a hollow body.

Advantageously, the at least one filter medium can be flowed through for filtration of the fuel from the interior to the exterior or from the exterior to the interior.

Advantageously, the at least one coalescing medium can be arranged in the flow path downstream and/or upstream of the at least one filter medium.

Advantageously, the at least one coalescing medium can at least partially cover the at least one filter medium at the inflow side and/or at the outflow side.

In a further advantageous embodiment, the housing can be designed to be openable and the at least one coalescing medium, in particular a coalescing element, can be arranged exchangeably in the housing. The at least one coalescing medium, in particular the at least one coalescing element, can thus be easily removed from the housing for exchange or for servicing purposes.

Alternatively, the coalescing medium/coalescing element can also be arranged fixedly in the housing. In this case, it is not required that the housing be openable.

BRIEF DESCRIPTION OF THE DRAWINGS

Further advantages, features, and details of the invention result from the following description in which an embodiment of the invention will be explained in more detail with the aid of the drawing. A person of skill in the art will expediently consider the features disclosed in the drawing, the description, and the claims in combination also individually and combine them to meaningful further embodiments.

In the Figures, same components are provided with same reference characters.

DESCRIPTION OF PREFERRED EMBODIMENTS

Figure 1:
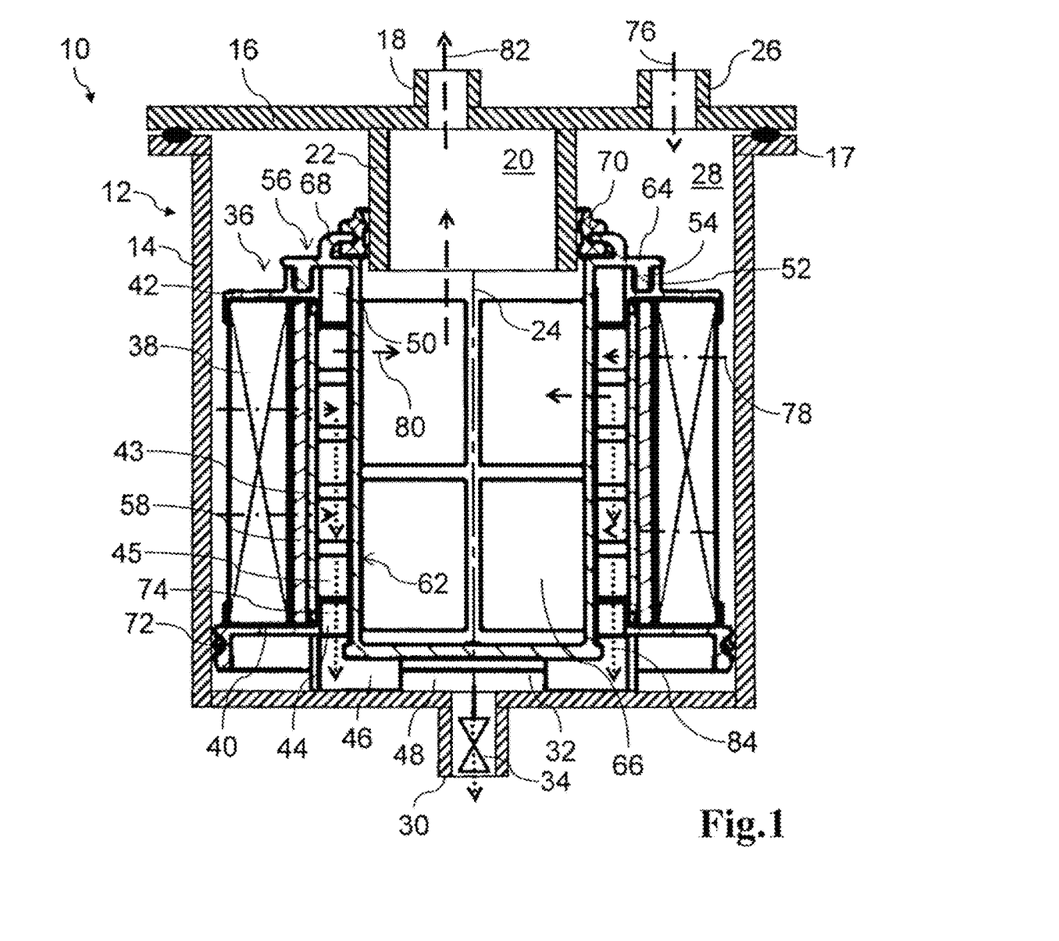
FIG. 1 shows a schematic longitudinal section of a fuel filter with an exchangeable three-stage filter element that comprises a coalescing medium of a sponge cloth material.

In FIG. 1, a fuel filter 10 of a fuel system of an internal combustion engine of a motor vehicle is illustrated in longitudinal section. The fuel filter 10 serves for purifying the fuel, for example, diesel fuel, used in operation of the internal combustion engine. The fuel contains an additive for improving the properties of the fuel. Moreover, the fuel filter 10 serves for separating water that is contained in the fuel.

The fuel filter 10 comprises a two-part housing 12 with a cup-shaped filter bowl 14 and a filter cover 16 that is separably arranged on the filter bowl 14. An annular seal 17 is arranged between the filter bowl 14 and the filter cover 16.

In the cover 16, an outlet socket 18 for the purified fuel is arranged approximately centrally and is connected outside of the housing 12 with a fuel discharge line, not shown in FIG. 1. In the interior of the housing 12, the outlet socket 18 is connected with a discharge space 20 in an interior of the connecting socket 22. The connecting socket 22 extends on the side of the cover 16 facing the interior of the housing coaxially to a filter axis 24.

In the normal mounted position under normal operating conditions of the internal combustion engine, the filter axis 24, as shown in FIG. 1, extends spatially in vertical direction. "Axial", "radial", "coaxial", and "circumferential" relate in the following, if not indicated otherwise, to the filter axis 24.

In radial direction outside of the connecting socket 22, the cover 16 has an inlet socket 26 for the fuel to be purified which is connected with an inlet space 28 in the housing 12. Outside of the housing 12, the inlet socket 26 is connected with a fuel supply line for the fuel that is not shown in FIG. 1.

At the bottom of the filter bowl 14, a water outlet in the form of a water drainage socket 30 is arranged coaxial to the filter axis 24. The water drainage socket 30 is connected with a water collecting space 32 at the bottom in the housing 12. Outside of the housing 12, the water drainage socket 30 is connected with a water drainage line, not illustrated, by means of which the water separated from the fuel can be drained from the housing 12. In the water drainage socket 30 a water drain valve 34 with a water level sensor is arranged. In the rest state, the water drain valve 34 is closed so that no fluid can escape from the water collecting space 32 through the water drainage socket 30 from the housing 12. Upon reaching a predetermined maximum water level in the water collecting space 32, the water drain valve 34 opens automatically so that the separated water can drain through the water drainage socket 30.

In the housing 12 an exchangeable filter element 36 is arranged. The filter element 36 is designed as a round filter element. The filter element 36 separates the inlet socket 26 seal-tightly from the outlet socket 18. The filter element 36 comprises a filter medium 38 which is folded in a star shape and which in particular filters particles out of the fuel to be purified. The filter medium 38 as a whole has the shape of a coaxial circular cylinder wall. On a lower end face which is facing the bottom of the filter bowl 14, the filter medium 38 is connected seal-tightly with a closure end disk 40. At its opposite end face which is facing the cover 16, the filter medium 38 is seal-tightly connected with a connecting end disk 42. A skeleton-like, fluid-permeable central tube 43 is extending between the connecting end disk 42 and the closure end disk 40 coaxially in an interior 45 of the filter medium 38 and connects the two end discs 40 and 42 to each other.

The closure end disk 40 comprises a coaxial opening 44. The opening 44 is surrounded by the central tube 43. The opening 44 connects the interior 45 with the water collecting space 32. On the exterior side which is facing the bottom of the filter bowl 14, the closure end disk 40 comprises, for example, four support webs 46 which are distributed uniformly along an imaginary coaxial circular cylinder wall. It is also possible to provide more or fewer than four support webs 46. The imaginary circular cylinder wall surrounds the opening 44 and the water drainage socket 30. With the support webs 46 the filter element 36 is supported against the bottom of the filter bowl 14. Between the support webs 46 there are connecting openings 48 by means of which distribution of water in the water collecting space 32 in radial direction also external to the support webs 46 is possible.

The connecting end disk 42 comprises a coaxial opening 50. The opening 50 is surrounded by two coaxial projections which are extending on the exterior side of the connecting end disk 42 in axial direction. The two projections delimit a receiving groove 52 for an annular insertion stay 54 of a separating unit 56 of the filter element 36.

Between the radial inner circumferential side of the filter medium 38 and the central tube 43 there is a coaxial coalescing medium 58. The coalescing medium 58 is comprised of a layer of sponge cloth material. The coalescing medium 58 is closed circumferentially and extends between the connecting end disk 42 and the closure end disk 40. The coalescing medium 58 serves for combining even smallest water droplets contained in the fuel to larger water drops. As a result of its coalescing function and/or its water separating function, the filter element 36 can also be referred to as a coalescing element. Correspondingly, the fuel filter 10 can be referred to as a water separator device for fuel.

Figure 2:
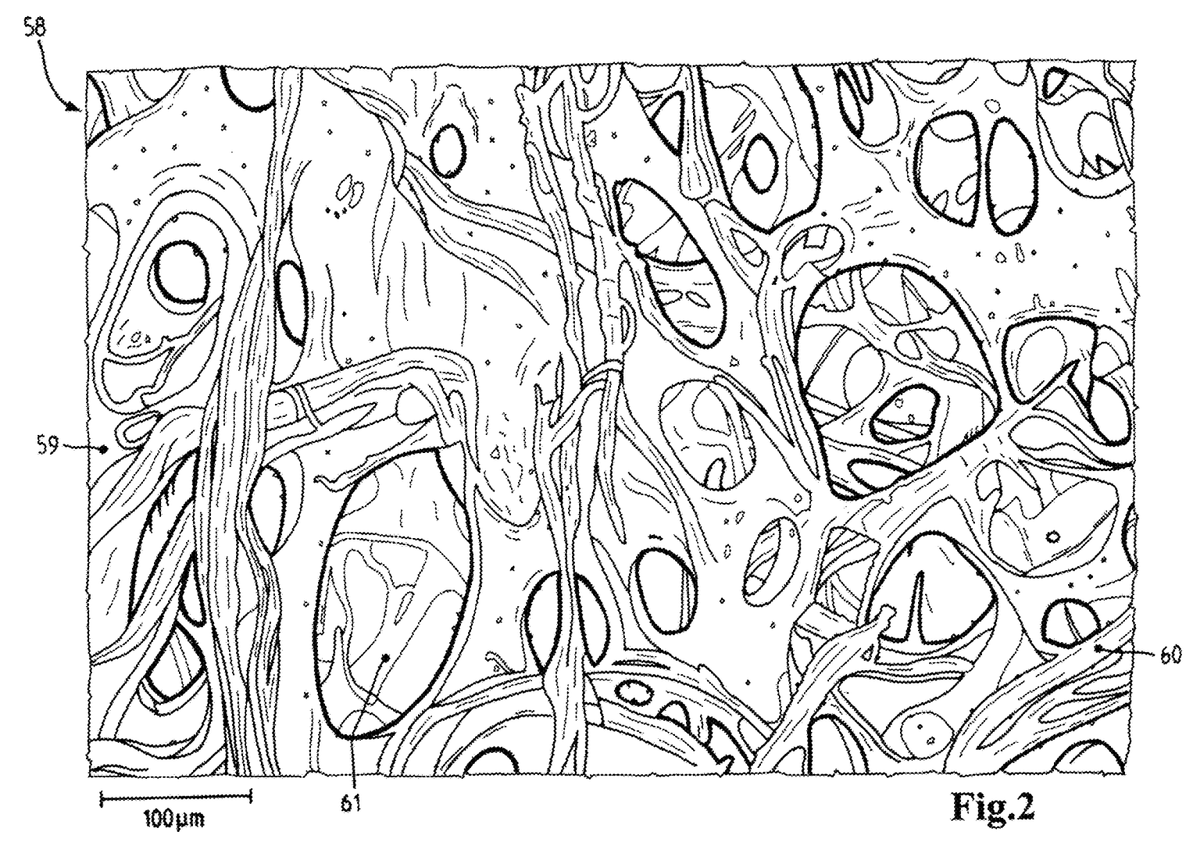
FIGS. 2 and 3 show schematic illustrations of the sponge cloth material of the fuel filter of FIG. 1, viewed in the flow-through direction of the fuel.
Figure 2A:
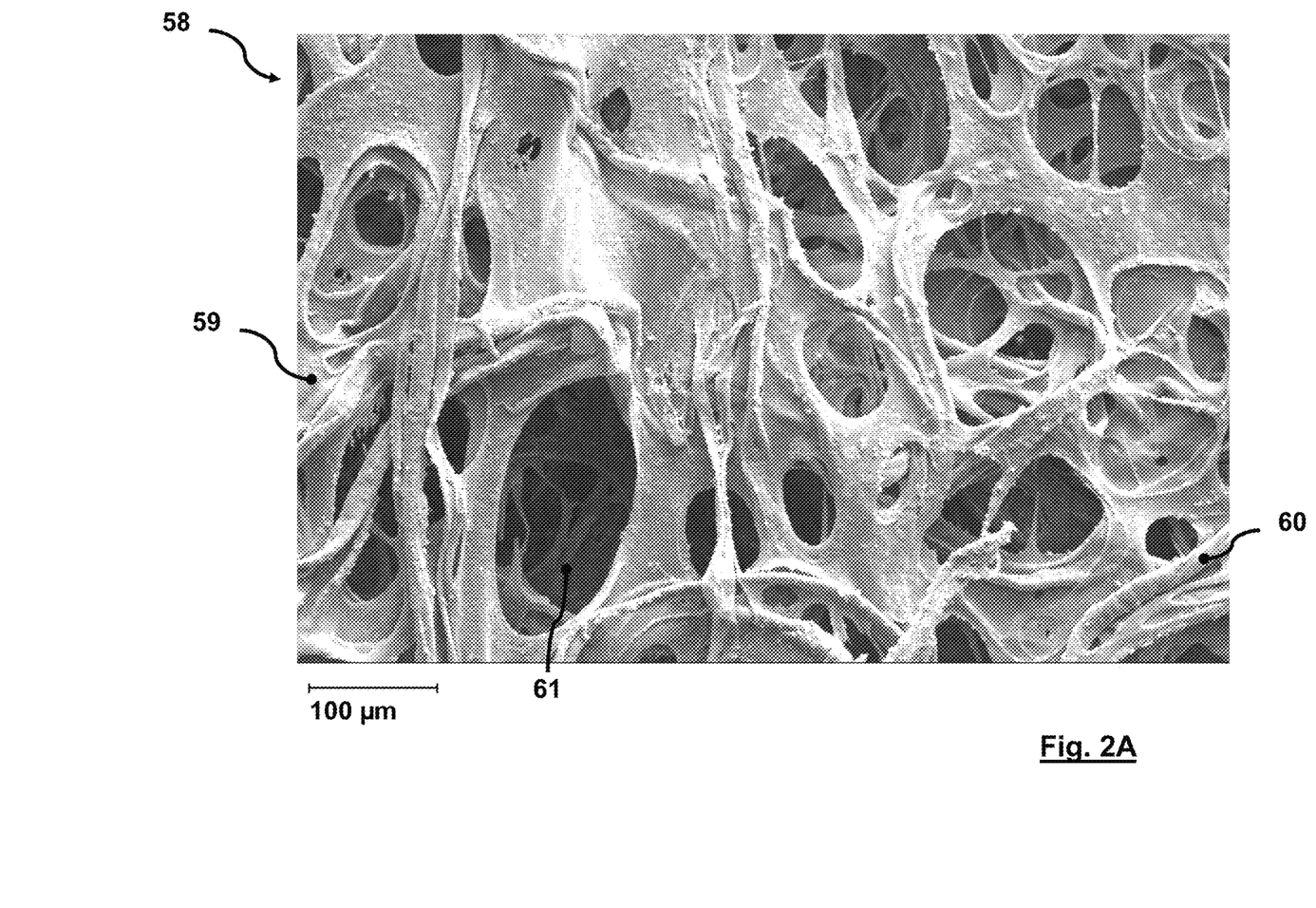
FIGS. 2A and 3A are original scanning electron microscope images of FIGS. 2 and 3, showing the sponge cloth material of the fuel filter of FIG. 1, viewed in the flow-through direction of the fuel.
Figure 3:
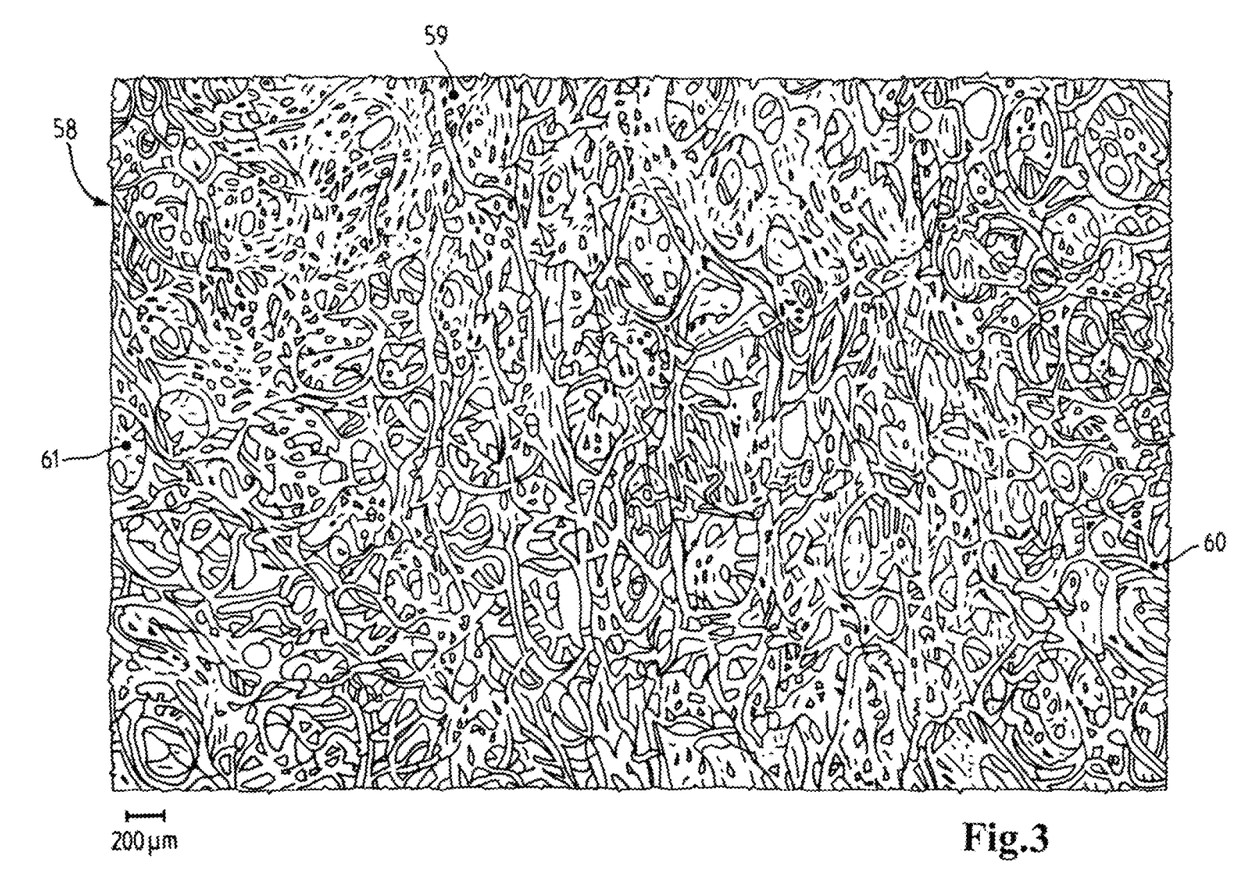
Figure 3A:
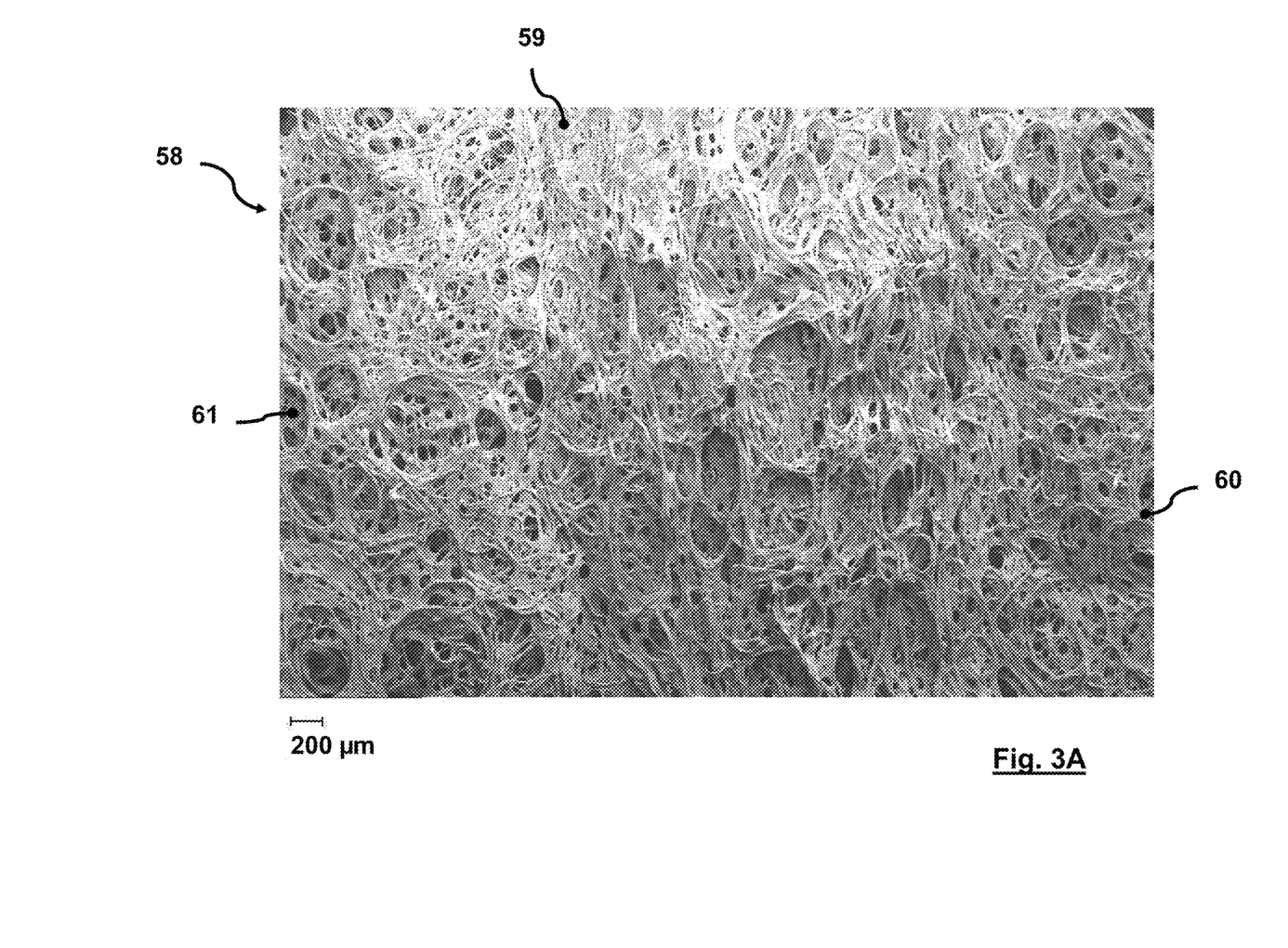
Figure 4:
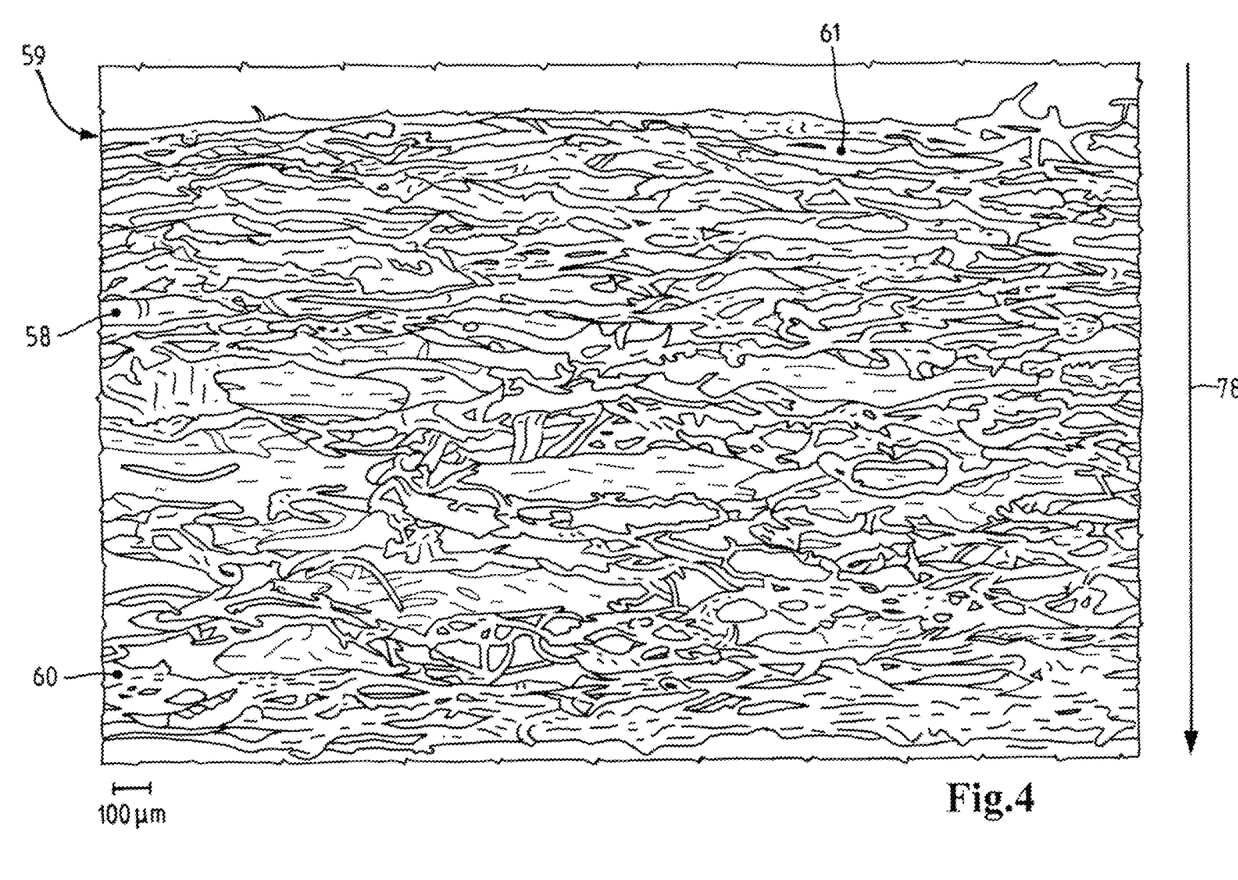
FIG. 4 shows a schematic illustration of the sponge cloth material of the fuel filter of FIG. 1, viewed transverse to the flow-through direction of the fuel.
Figure 4A:
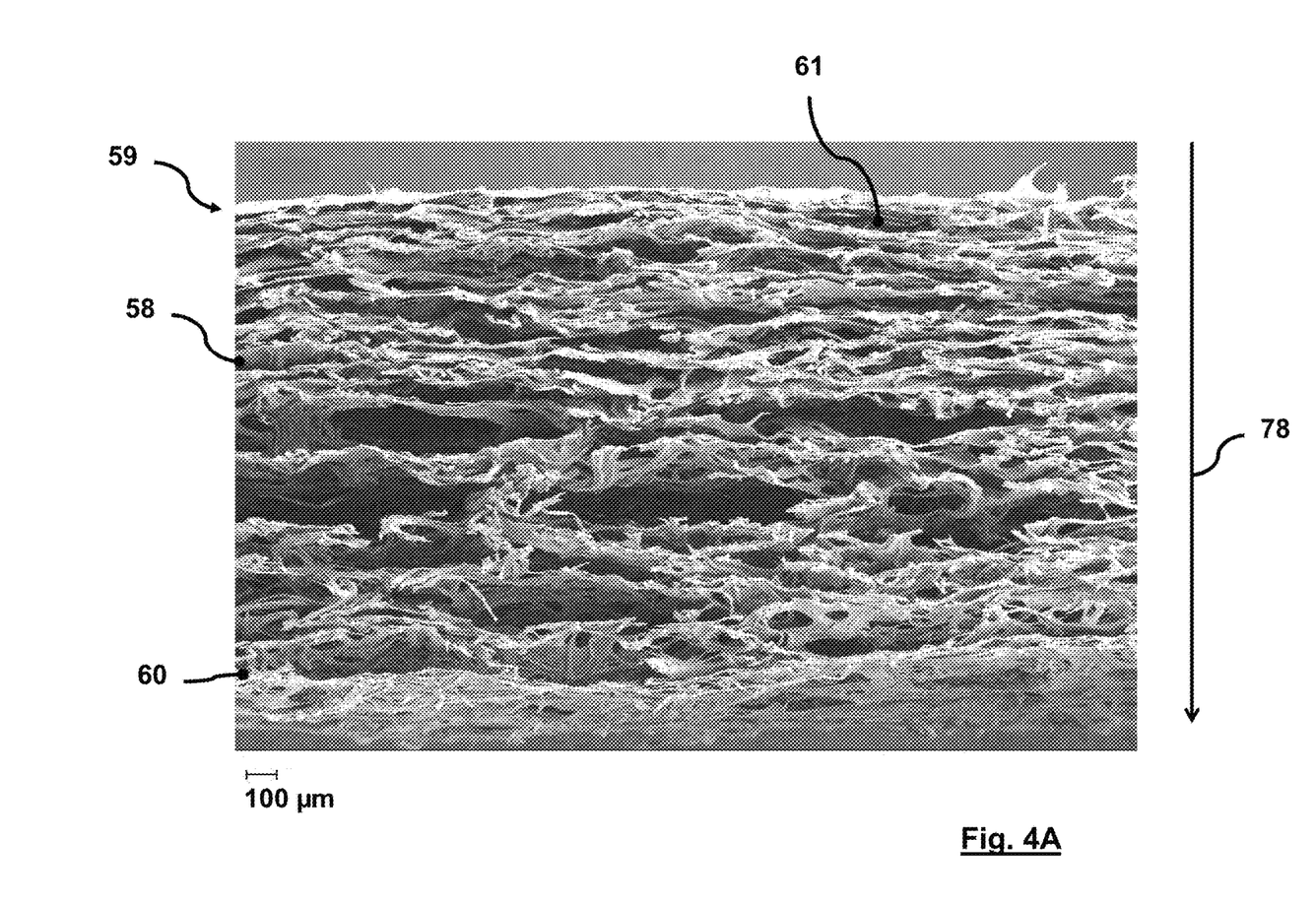
FIG. 4A is an original scanning electron microscope image of FIG. 4 showing the sponge cloth material of the fuel filter of FIG. 1, viewed transverse to the flow-through direction of the fuel.

The sponge cloth material is in particular a layered structure with a thickness in the dry state of approximately 0.4 cm to 2 cm. FIGS. 2 and 3 show schematic illustrations of the fabric material of the coalescing medium 58 viewed in the flow direction 78 of the fuel. FIG. 4 shows the sponge cloth material in a schematic illustration transverse to the flow direction 78. Here, the layer structure of the sponge cloth material can be seen.

The sponge cloth material is produced according to a viscose method, for example, a cellulose xanthate method. For this purpose, wood is processed in reactors by means of solvents to viscose 59. Cotton is individualized as staple fiber with defined fiber lengths by tearing. The cotton fibers 60 can be seen in particular in FIG. 2. The proportion of viscose in the starting material for the sponge cloth material is approximately 70%, the proportion of cotton is approximately 30%.

Subsequently, the initially flowable viscose 59 and the cotton fibers 60 are mixed and kneaded together with Glauber's salt and optionally a coloring agent. The incorporated Glauber's salt serves for pore formation. It determines the future pore size of the finished sponge cloth material.

The kneaded mass is placed, for example, spread, by a machine, in particular by means of nozzles, onto a grid.

Subsequently, the mass is dried on the grid and solidified. In the solidification process, the viscose can be regenerated. The viscose 59 and the cotton fibers 60 fuse to a unit. In this context, the initially flowable viscose 59 interlaces with the cotton fibers 60. The viscose 59 "fuses" so to speak between the cotton fibers 60 to larger contiguous areas in which crystals of Glauber's salt are embedded. The viscose 59 acts as a bonding material and connects the cotton fibers 60. The cotton fibers 60 act as a carrier material and contribute substantially to the strength of the finished sponge cloth material.

The Glauber's salt is washed out subsequently. The dissolved crystals of the Glauber's salt are washed out. The washed-out mass is dried. The finished sponge cloth material has the corresponding pores 61.

Figure 5:
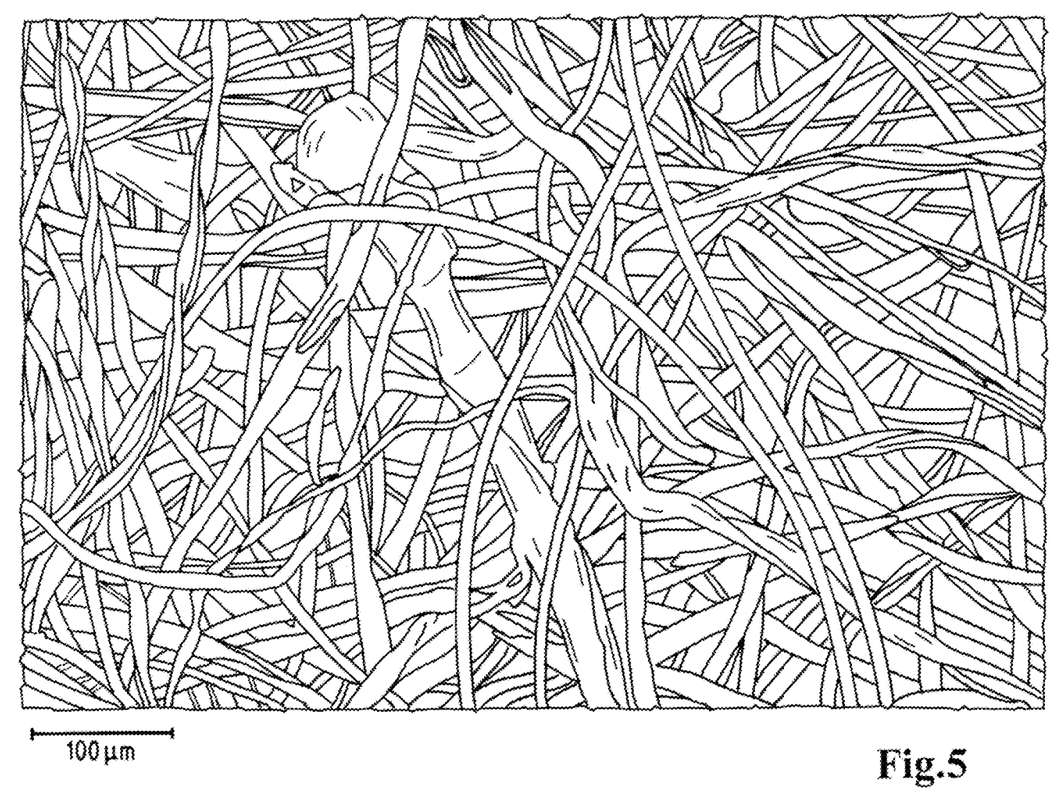
FIG. 5 is a schematic illustration of a coalescing medium of a fleece known in the prior art, viewed in the flow-through direction of the fuel.
Figure 5A:
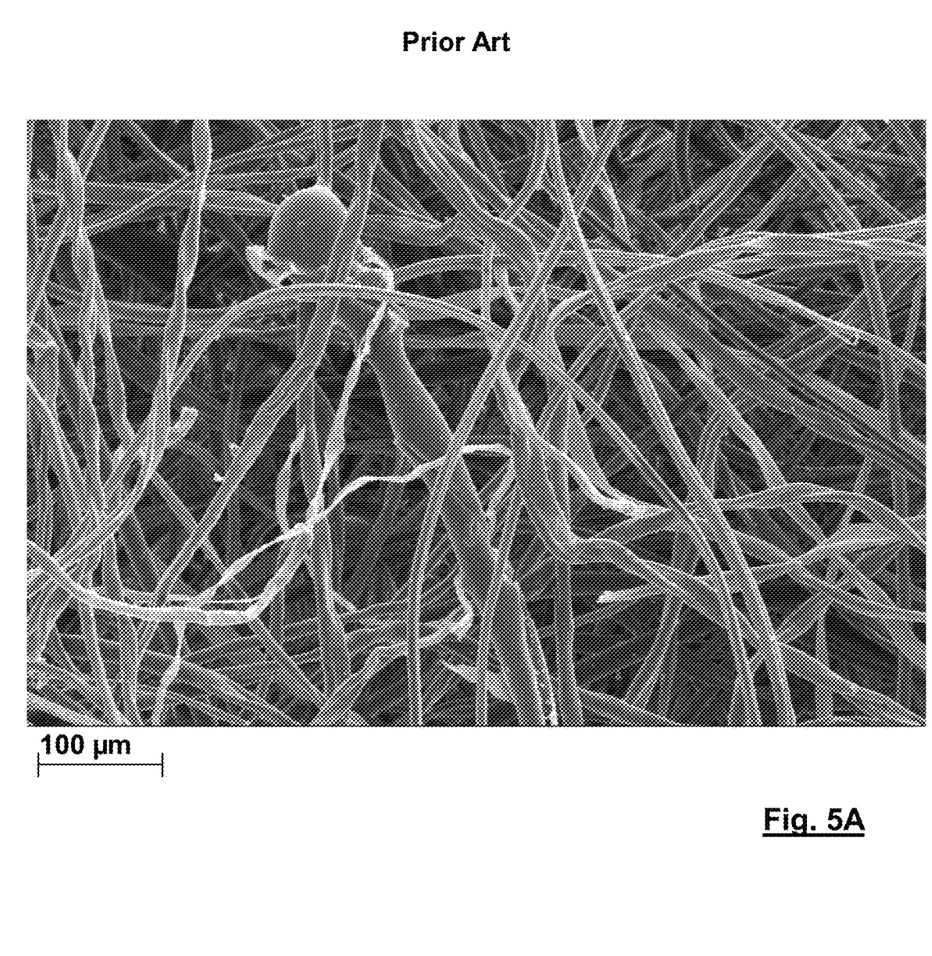
FIG. 5A is an original scanning electron microscope image of FIG. 5 showing a coalescing medium of a fleece known in the prior art, viewed in the flow-through direction of the fuel.

In FIG. 5, a coalescing material known in the prior art comprised of a nonwoven material of cotton, viscose, and polyester fibers (PES) is illustrated for differentiation. It can be seen clearly that the fibers therein, in contrast to the invention, are not connected by means of a bonding material.

The separating unit 56 comprises a support basket 62 with a connecting section 64 which comprises also the insertion stay 54 and a separating medium 66.

The connecting section 64 is approximately disk-shaped with a coaxial opening into which the connecting socket 22 of the cover 16 projects. On its exterior side which is facing the cover 16, the connecting section 64 comprises a coaxial connector socket 68. The connector socket 68 is bent at its free end face by 90° in radial direction inwardly. On the radial inner rim of the connector socket 68 a profiled ring seal 70 is seated. The connecting socket 22 is inserted into the connector socket 68 such that the connection is sealed by the profiled ring seal 70.

The separation unit 56 is axially inserted, with the separating medium 66 leading, through the opening 50 of the connecting end disk 42. The support basket 62 and the separating medium 66 are located in the interior which is delimited by the coalescing medium 58, i.e., also in the interior 45 of the filter medium 38.

The separation medium 66 is comprised of a hydrophobic screen fabric. It has the shape of a tube coaxial to the filter axis 24. It extends from the connecting end disk 42 to the closure end disk 40. The separation medium 66 is circumferentially closed.

The circumferential wall of the support basket 62 has a grid-like structure and is liquid-permeable. On its end face which is correlated with the connecting socket 22, the support basket 62 is open. The lower end face of the support basket 62 which is facing the water collecting space 32 is closed. The separation medium 66 contacts the circumferential side of the support basket 62.

Between the separation medium 66 and the coalescing medium 58, a precipitation gap 74 is provided in the interior 45. The precipitation gap 74 has the shape of an annular space. The precipitation gap 74 is delimited in radial outward direction by the coalescing medium 58 and in radial inward direction by the separating medium 66.

On the radial outer circumferential side of the closure end disk 40 there is also an annular seal 72 arranged which supports in radial outward direction against the radial inner circumferential side of the filter bowl 14. The annular seal 72 seals the inlet space 28 relative to the water collecting space 32.

In operation of the fuel filter 10, fuel that contains an additive and is to be purified and that may be contaminated with water and dirt particles is supplied from the fuel supply line, indicated by arrow 76, through the inlet socket 26 to the inlet space 28.

The fuel flows through the filter medium 38, indicated by arrows 78, from its radial outward raw side to its radial inward clean side. The particles are thereby removed from the fuel. The filter medium 38 forms a first stage of the all together three-stage fuel filter 10 for the purification/water separation.

The fuel with the additive, the particles having been removed, flows at the clean side through the pores 61 of the coalescing medium 58 in the radial direction from the exterior to the interior. In this context, even smallest water droplets that are contained in the fuel are caught in the pores 61 of the coalescing medium 58 and combined to greater water drops. The coalescing medium 58 forms a second stage for the purification/water separation. When the drop size is sufficient, the large water drops are again entrained by the fuel that is flowing through.

The fuel with the additive and the large water drops flow through the openings of the central tube 43 and reach the precipitation gap 74.

The fuel with the additive flows through the separation medium 66, which forms a third stage for the purification/water separation, in radial direction from the exterior to the interior, indicated by arrows 80, and flows in upward direction into the discharge space 20. The fuel with the additive that has been purified and from which the water has been removed exits the discharge space 20 through the outlet socket 18, indicated by arrows 82, and is supplied to the fuel discharge line.

The large water drops on the other hand are retained by the separation medium 66. Due to their greater specific weight compared to the fuel, they sink down in the precipitation gap 74, indicated by arrows 84, into the water collecting space 32.

As soon as the water level sensor of the water drain valve 34 indicates that a predetermined maximum water level has been reached, the water drain valve 34 is automatically opened. The water exits from the water collecting space 32 through the water discharge socket 30 and flows into the water drainage line.

For servicing purposes, for example, for exchange of or for cleaning the filter element 36, the cover 16 is removed in axial direction from the filter bowl 14. The filter element 36 is then pulled out in axial direction from the filter bowl 14.

For installation, the filter element 36 with the closure end disk 40 leading is inserted in axial direction into the filter bowl 14. Subsequently, the cover 16 with the connecting socket 22 leading is pushed in axial direction onto the open side of the filter bowl 14 so that the connecting socket 22 projects seal-tightly into the profiled ring seal 70.

While specific embodiments of the invention have been shown and described in detail to illustrate the inventive principles, it will be understood that the invention may be embodied otherwise without departing from such principles.

What is claimed is:

1. A coalescing element for a water separator device for fuel, the coalescing element comprising
   at least one coalescing medium configured to separate water contained in a fuel from the fuel,
   wherein the coalescing element is configured to be arranged in a housing of the water separator device such that the coalescing element separates at least one fuel inlet of the housing from at least one fuel outlet of the housing and the at least one coalescing medium is arranged in a flow path of the fuel from the at least one fuel inlet to the at least one fuel outlet,
   wherein the at least one coalescing medium comprises at least one sponge-like cloth coalescing material comprising cotton fibers, viscose and a pore forming agent of Glauber's salt crystals embedded into the cotton fibers, the embedded Glauber's salt crystals forming pores in the at least one sponge-like cloth coalescing material, a size of the Glauber's salt crystals determining a size of the pores in the at least one sponge-like cloth coalescing material;
   wherein the viscose bonds the cotton fibers together, holding the at least one sponge-like cloth coalescing material together;
   wherein the cotton fibers, viscose and embedded Glauber's salt crystals form multiple contiguous areas of coalescing material that are bonded to each other, forming holes or pores between the contiguous areas, the holes or pores configured for catching water droplets and for passage of the water, wherein the sponge-like cloth coalescing material can swell so the absorption capacity for water is increased,
   wherein the at least one coalescing medium is suitable for coalescing water
   wherein the at least one coalescing material is produced from a mass containing the pore forming agent,
   wherein the pore forming agent has been removed from the at least one coalescing material when finished.

2. The coalescing element according to claim 1, further comprising
   at least one filter medium.

3. The coalescing element according to claim 1, wherein the at least one coalescing material is comprised of a layered fabric sponge cloth material.

4. The coalescing element according to claim 1, wherein the at least one coalescing material is comprised of a sponge cloth material produced by a viscose method.

5. The coalescing element according to claim 4, wherein the viscose method is a cellulose xanthate method.

6. The coalescing element according to claim 1, wherein the at least one coalescing medium is a hollow body.

7. The coalescing element according to claim 1, further comprising
   at least one hydrophobic fuel-permeable separating medium in the form of a hollow body for separation of water contained in the fuel,
   wherein the at least one separating medium is a hydrophobic screen fabric arranged in the flow path of the fuel downstream of and spaced apart away from the at least one coalescing medium such that at least one precipitation gap for separated water is formed between the at least one coalescing medium and the at least one separating medium.

8. The coalescing element according to claim 7, wherein the at least one separating medium surrounds the at least one coalescing medium or is arranged in an interior of the at least one coalescing medium.

9. The coalescing element according to claim 1, wherein the at least one coalescing medium,
   at least one filter medium, and
   at least one separating medium are coaxially arranged.

10. The coalescing element according to claim 1, wherein the coalescing element is a round filter element.

11. A water separator device comprising:
   a housing comprising
      at least one fuel inlet for a fuel to be treated,
      at least one fuel outlet for treated fuel, and
      at least one water outlet for water separated from the fuel;
   a coalescing element according to claim 1 having at least one coalescing medium for separation of water contained in the fuel,
   the at least one coalescing medium arranged in a flow path of the fuel from the at least one fuel inlet to the at least one fuel outlet.

12. The water separator device according to claim 11, further comprising
   at least one filter medium arranged in the housing.

13. The water separator device according to claim 11, wherein
   the housing is openable and the at least one coalescing medium is arranged exchangeably in the housing.

* * * * *